United States Patent Office 2,848,305
Patented Aug. 19, 1958

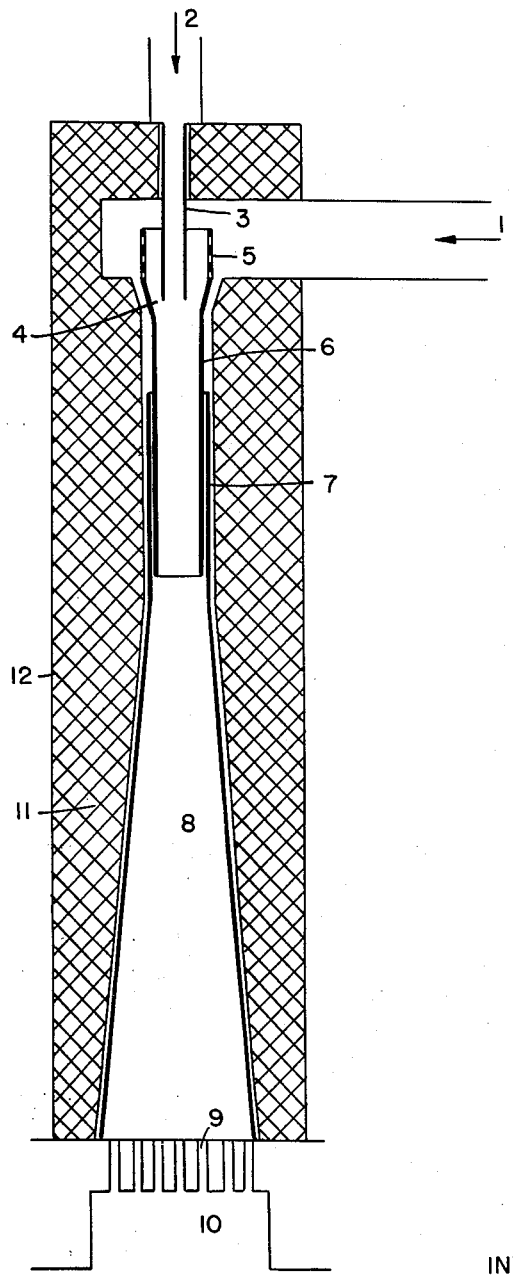
INVENTORS:
ERWIN LEHRER
WERNER ALTSTAEDT

2,848,305

APPARATUS FOR THE PRODUCTION OF ACETYLENE BY INCOMPLETE COMBUSTION OF HYDROCARBONS

Erwin Lehrer, Bad Durkheim, and Werner Altstaedt, Ludwigshafen (Rhine), Germany, assignors to Badische Anilin- & Soda-Fabrik Aktiengesellschaft, Ludwigshafen (Rhine), Germany Application June 10, 1955, Serial No. 514,616

Claims priority, application Germany June 12, 1954

5 Claims. (Cl. 23—277)

This invention relates to an improved apparatus for the production of acetylene by incomplete combustion of hydrocarbons.

A known apparatus for the production of acetylene by incomplete combustion of hydrocarbons, such as methane or other gaseous hydrocarbons, or gas mixtures containing gaseous aliphatic hydrocarbons with oxygen with the formation of a flame consists of a supply member for the gases to be reacted arranged as symmetrically as possible about the axis of the flow direction of the gas mixture, an annexed elongated mixing chamber, preferably of circular cross-section, which widens conically in the direction of the gas flow and a gas distributor arranged in front of the reaction chamber. Such an apparatus is described in U. S. patent specification No. 2,664,450. The said gas distributor preferably consists of a number of parallel channels from which the prepared mixture flows into the reaction chamber in which the components react with each other with the formation of a flame. The reaction gases are cooled as quickly as possible, preferably by spraying in water.

The mixing of the heated gases gives rise to difficulty however because the wall of the mixing chamber assumes the temperature of the gases, whereas the housing surrounding the mixing chamber is kept at a very much lower temperature by an insulating layer arranged between the wall of the mixing chamber and the housing in order that a gaslight closure of the arrangement from the surroundings can be effected by simple means. This temperature difference between the mixing chamber and the housing causes considerable thermal stresses which can lead to damage of this arrangement.

The object of the present invention is to provide an apparatus which is not subject to these disadvantages. A more specific object of the invention is to provide an apparatus for the production of acetylene by incomplete combustion of hydrocarbons containing an elongated mixing chamber with a telescopic combination of a cylindrical elongation of the supply member for the reactant gases within a cylindrical portion of the elongated mixing chamber.

These and other objects are accomplished in accordance with the invention by an apparatus comprising a supply member for the reactant gases which has a cylindrical elongation, an elongated mixing chamber having a conically widened portion in the direction of the gas flow and a cylindrical attachment to said portion and a gas distributor situated in front of the reaction chamber. The cylindrical elongation of the supply member is telescopically combined with the cylindrical attachment of the mixing chamber and the mixing chamber is surrounded by an insulating layer which is enclosed in a rigid housing.

In the new arrangement the wall of the mixing chamber is surrounded in known manner by a heat-insulating layer and a rigid housing enclosing this layer and supporting the supply member for the gases and the mixing chamber in fixed relationship to each other. At the point in the mixing chamber at which the gases to be mixed come together, there follows the cylindrical elongation which is displaceable in its longitudinal direction in an attachment, similarly cylindrical, of the conically widening part of the mixing chamber.

As the result of being heated the mixing device expands more than the wall of the outer rigid housing, but the cylindrical part of the mixing apparatus can move freely with respect to the cylindrical attachment. Thermal stresses which could lead to a deformation and destruction of the mixing device therefore do not occur therein.

The difference between the inner diameter of the cylindrical attachment of the conical widened portion of the mixing chamber and the outer diameter of the cylindrical elongation of the supply member for the gases should be only sufficiently great to allow a free movement of these parts. Preferably this difference should be less than one millimeter. The overlapping distance in longitudinal direction in this expansion joint should be greater than the expansion in longitudinal direction which occurs when the mixing chamber is heated from room temperature to operating temperature. In a mixing chamber with a length of four meters, the longitudinal expansion for an operating temperature of 600° C. is, for instance, 25 millimeters, so that the overlapping length of the cylindrical attachment of the conical widened portion of the mixing chamber and the cylindrical elongation of the supply member for the gases should be greater than 25 millimeters.

It is advantageous to use a member comprising two concentric tubes, each supplying one of the two reactants to the point of mixing, and to secure to the inner tube of this supply member the cylindrical part which is adjacent to the mixing point and is displaceable in its longitudinal direction in the cylindrical attachment to the conically widening part of the mixing chamber.

The accompanying drawing shows diagrammatically an embodiment of apparatus according to the present invention. Preheated hydrocarbon is supplied through a pipe 1 and the hot oxygen through a pipe 2. The oxygen passes through the pipe 3 to the mixing point 4, while the hydrocarbon flows through the openings in the connecting piece 5 to the mixing point 4. The connecting piece 5 secured to the pipe 3 carries a pipe 6 which forms the upper cylindrical part of the mixing chamber. The pipe 6 is displaceable within an attachment 7 of the conically widened part 8 of the mixing chamber. The mixture leaves the mixing chamber through channels 9 and passes into a reaction chamber 10 in which the flame reaction takes place. The walls of the mixing chamber are surrounded by insulating material 11 situated in a housing 12. The parts 3, 5, 6, 7 and 8 are made of metal preferably of alloys of iron which are non-scaling and resistant against oxygen at temperatures up to 700° C. Such alloys should preferably contain 5–25% of chromium, 0.4–3% of silicon, 0.1–0.2% of carbon and optionally 0.5–2% of aluminum.

The attachment of the displaceable pipe 6 of the mixing chamber to the inner pipe 3 is preferably made adjustable in such manner that the longitudinal axis of the displaceable part can be inclined by a small angle with respect to the longitudinal axis of the inner pipe. In this way a good centering of the junction is ensured, i. e., such that the elongated cylindrical member or tube 6 can be accurately centered concentrically within the elongated cylindrical member 7. It will be apparent that such adjustment can be accomplished by a very slight bending of the tube 6 with respect to the inner pipe 3.

We claim:

1. An improved apparatus for the production of acetylene by incomplete combustion of heated gaseous hydrocarbons and oxygen in a flame reaction comprising: means to supply the heated reactant gases to a mixing chamber; an elongated mixing chamber conically widened in the direction of gas flow, said mixing chamber and said supply means being supported in fixed relationship with each other; an expansion joint connecting said supply means and said mixing chamber, said expansion joint including a first elongated cylindrical member secured at one end to said supply means and in gaseous connection therewith to receive said gaseous hydrocarbons and oxygen, the other end of said first cylindrical elongated member being free for longitudinal displacement under operating temperatures, and said expansion joint also including a second elongated cylindrical member attached at one end as an extension to the smallest end of said conically widened mixing chamber and extending freely therefrom for longitudinal displacement under operating temperatures, said first elongated cylindrical member being arranged for gaseous connection within said second elongated cylindrical member during longtudinal displacement of said members relative to each other under operating temperatures; an insulating layer surrounding said mixing chamber enclosed by a rigid housing; and a reaction chamber for said flame reaction adapted to receive the reactant gases from said mixing chamber through a gas distributor.

2. An improved apparatus as claimed in claim 1 wherein said supply means, said elongated mixing chamber, and each of said first and said second cylindrical elongated members are constructed of a non-scaling and oxygen-resistant iron alloy.

3. An improved apparatus as claimed in claim 1 wherein said supply means includes two concentric tubes, said first cylindrical elongated member being secured to the inner tube of said supply means and being in gaseous connection with each of said concentric tubes.

4. An improved apparatus as claimed in claim 3 wherein said first cylindrical elongated member is adjustably secured to the inner tube of said supply means such that the longitudinal axis of said first cylindrical elongated member can be inclined by a small angle with respect to said longitudinal axis of said inner tube.

5. An improved apparatus as claimed in claim 1 wherein said first cylindrical elongated member is concentrically centered within said second elongated cylindrical member such that the difference between the inner diameter of said second cylindrical member and the outer diameter of said first cylindrical member is less than one millimeter.

References Cited in the file of this patent

UNITED STATES PATENTS

| | | |
|---|---|---|
| 1,228,217 | Kennedy | May 29, 1917 |
| 2,417,606 | Mitchell et al. | Mar. 18, 1947 |
| 2,572,338 | Hartwig et al. | Oct. 23, 1951 |
| 2,597,232 | Eckholm et al. | May 20, 1952 |
| 2,664,450 | Sachssert et al. | Dec. 29, 1953 |

UNITED STATES PATENT OFFICE
CERTIFICATE OF CORRECTION

Patent No. 2,848,305                                       August 19, 1958

Erwin Lehrer et al.

It is hereby certified that error appears in the printed specification of the above numbered patent requiring correction and that the said Letters Patent should read as corrected below.

Column 1, line 43, for "gaslight" read -- gastight --.

Signed and sealed this 4th day of November 1958.

(SEAL)
Attest:

KARL H. AXLINE
Attesting Officer

ROBERT C. WATSON
Commissioner of Patents